United States Patent
Bortnikov et al.

(10) Patent No.: US 10,678,813 B2
(45) Date of Patent: Jun. 9, 2020

(54) SCALING QUORUM BASED REPLICATION SYSTEMS

(71) Applicant: INTERNATIONAL BUSINESS MACHINES CORPORATION, Armonk, NY (US)

(72) Inventors: Vita Bortnikov, Haifa (IL); Shlomit I. Shachor, Yokneam Eilit (IL); Ilya Shnayderman, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 15/194,612

(22) Filed: Jun. 28, 2016

(65) Prior Publication Data

US 2017/0371747 A1 Dec. 28, 2017

(51) Int. Cl.
*G06F 16/27* (2019.01)
*G06F 11/16* (2006.01)

(52) U.S. Cl.
CPC ........ *G06F 16/278* (2019.01); *G06F 11/1658* (2013.01)

(58) Field of Classification Search
CPC ........... G06F 17/30584; G06F 11/1658; G06F 16/278
See application file for complete search history.

(56) References Cited

U.S. PATENT DOCUMENTS

| | | | |
|---|---|---|---|
| 8,935,206 B2 | 1/2015 | Aguilera et al. | |
| 2005/0149522 A1* | 7/2005 | Cookson, Jr. ......... | G06F 16/211 |
| 2008/0215544 A1* | 9/2008 | Galindo-Legaria ......................... | G06F 16/2452 |
| 2011/0225121 A1* | 9/2011 | Cooper ............. | G06F 17/30578 707/634 |
| 2014/0181026 A1 | 6/2014 | Bolosky et al. | |
| 2014/0250073 A1* | 9/2014 | Zalpuri ............. | G06F 17/30174 707/636 |
| 2015/0120658 A1 | 4/2015 | Rath et al. | |
| 2015/0301901 A1 | 10/2015 | Rath et al. | |

OTHER PUBLICATIONS

Bharat, Mirror, mirror on the Web: a study of host pairs with replicated content, pp. 501-512 (Year: 1999).*
Rao et al., "Using Paxos to Build a Scalable, Consistent, and Highly Available Datastore", Proceedings of the VLDB Endowment, vol. 4, No. 4, Aug. 29-Sep. 3, 2011, pp. 243-254.
Liu et al., "DAX: A Widely Distributed Multi-Tenant Storage Service for DBMS Hosting", Proceedings of the VLDB Endowment , vol. 6, No. 4, Aug. 2013, pp. 243-264.

(Continued)

*Primary Examiner* — Albert M Phillips, III
(74) *Attorney, Agent, or Firm* — Robert D. Bean (57) ABSTRACT

A computer determines whether it has received user input or a node within a replica set has reached a capacity threshold. Based on receiving user input or determining that a node within a replica set has reached a capacity threshold, creating a snapshot of the data stored in the replica set and partitioning the data based on the created snapshot. The computer then initializing nodes within a new replica set and moves a partition from the original replica set to the new replica set before deleting the other partition from the old replica set.

20 Claims, 8 Drawing Sheets

(56) References Cited

OTHER PUBLICATIONS

Michael, "Scaling Leader-Based Agreement Protocols for State Machine Replication", https://repositories.lib.utexas.edu/handle/2152/29985, May 2015, 2 pages.
Mell et al., "The NIST Definition of Cloud Computing", National Institute of Standards and Technology, Special Publication 800-145, Sep. 2011, pp. 1-7.
Lamport et al, "Vertical Paxos and Primary-Backup Replication", PODC'09, Aug. 10-12, 2009, Calgary, Alberta, Canada. ACM, pp. 1-2.

* cited by examiner

SCALING QUORUM BASED REPLICATION SYSTEMS

BACKGROUND

The present invention relates generally to data storage, and more particular to quorum-based replication systems. Data storage is increasing in popularity as the world moves towards a digital age. Information once written in the pages of books and newspapers is now digitally available for searching, filtering, and analyzing from a variety of sources, such as the internet or a local database. Moreover, this information is more available than ever with the popularity of electronic devices, such as cell phones and computers, and the accessibility of such devices has resulted in vast amounts of user generated information, such as photos, comments, posts, and interactions with others. All of this data requires storage, and while data storage is relatively stable, it is possible for data servers storing such data to fail, losing potentially valuable information. In order to provide some fault tolerance, a system has been implemented in which identical data is stored in multiple locations forming what is known as a data replication service. In a data replication service, data is made redundant by replicating it across multiple storage devices, or nodes, within what is known as a replica set. If one of the nodes within a replica set fails, the data can be recovered from one of the other nodes within the replica set which has backed up the same data. The redundancy of the data within the cluster allows the data to remain accessible and the service to remain fully operational even in the face of some node failures.

SUMMARY

Embodiments of the present invention disclose a method, system, and computer program product for a database scaling system. A computer determines whether it has received user input or a node within a replica set has reached a capacity threshold. Based on receiving user input or determining that a node within a replica set has reached a capacity threshold, creating a snapshot of the data stored in the replica set and partitioning the data based on the created snapshot. The computer then initializing nodes within a new replica set and moves a partition from the original replica set to the new replica set before deleting the other partition from the old replica set.

DETAILED DESCRIPTION

Embodiments of the present invention will now be described in detail with reference to the accompanying figures.

As previously mentioned, data replication services store identical data redundantly across multiple storage devices (or nodes) within a replica set (or replication cluster) in order to back up and make available the data even if all but one node within the replica set fails. For example, data replication is often performed between a phone, computer, and "cloud storage" (remote storage) belonging to a user. In this example, each of the phone, cloud, and computer are considered nodes within a replication set and information stored on one node is backed up to other nodes within the replica set. For example, photos on the phone of a user may also be saved, or backed up, on a personal computer and cloud.

However, because the same data is replicated across all nodes within the replica set (the photo in the example above is stored on the phone, cloud, and computer), a replication service is limited in scalability by the node of the cluster with the least storage capacity. For example, if the phone of a user has 16 GB storage capacity and the cloud can store up to 2 GB of user data, then phone data exceeding 2 GB will not be replicated to the cloud because the cloud can only store up to 2 GB, reducing the effectiveness of the replication service. A partial solution to this problem is to add more nodes to the system, such as incorporating the computer of the user as a node in the replica set. Assuming the computer of the user has a storage capacity of 500 GB, if the user adds the computer to the replica set, now all 16 GB of data on the phone of the user can be backed up on the computer of the user. However, adding this additional node does not rectify the inability of another node in the replica set, i.e. the cloud storage, to replicate all 16 GB of phone data. Rather, the phone and computer of the user backup all 16 GB of data while the cloud storage only replicates up to 2 GB of data. Scaling replication systems such as that described above are a common problem as more and more electronic data is created and stored, except instead of a phone, cloud, and computer, the nodes may be servers designed to store large amounts of data. Often times, these servers are stored vast distances apart from each other for multiple reasons, making it difficult and expensive to physically add more storage capacity to an individual node (in the example, increasing cloud storage). This is because nodes in a replica set are stored apart from each other to avoid both nodes failing simultaneously, for instance in the case of a natural disaster or power outage. In addition, having the information stored in multiple locations allows a user to obtain the replicated data from the closest proximity node, saving time and increasing efficiency.

Another known solution to providing extensibility and scalability to such systems is to create a master cluster for keeping the information about replica sets, similar to a catalog service, where replica sets can be added when needed. However, this approach requires the master cluster be predefined upfront and include more components within the system, increasing system complexity and resource consumption while decreasing manageability. Not only do these additional components cost time and money, but they are also required for each replica set and, thus, the process of predefining a master is compounded by the amount of replica sets desired. Similarly, predefining the master cluster complicates the client code which must be first introduced into the master cluster and, thus, as the number of clients are increased, as is the cost of predefining the master cluster. Reclustering alleviates these problems by allowing a user to split existing clusters into multiple partitions rather than predefining the master cluster.

Another benefit of reclustering is that creating cluster IDs (or replica IDs) for each cluster and the manner in which the data is split allows for replication services to remain operational despite moving some of the data to a new cluster. Many replication services require a period of time where requests cannot be served due to the fact that state and control are moved from one cluster to another. Conversely, reclustering defines new cluster IDs prior to initializing the new cluster which allows for the identification and modification of data stored in either cluster throughout the reclustering process. This reclustering process is described in greater detail with reference to the following Figures.

Figure 1:
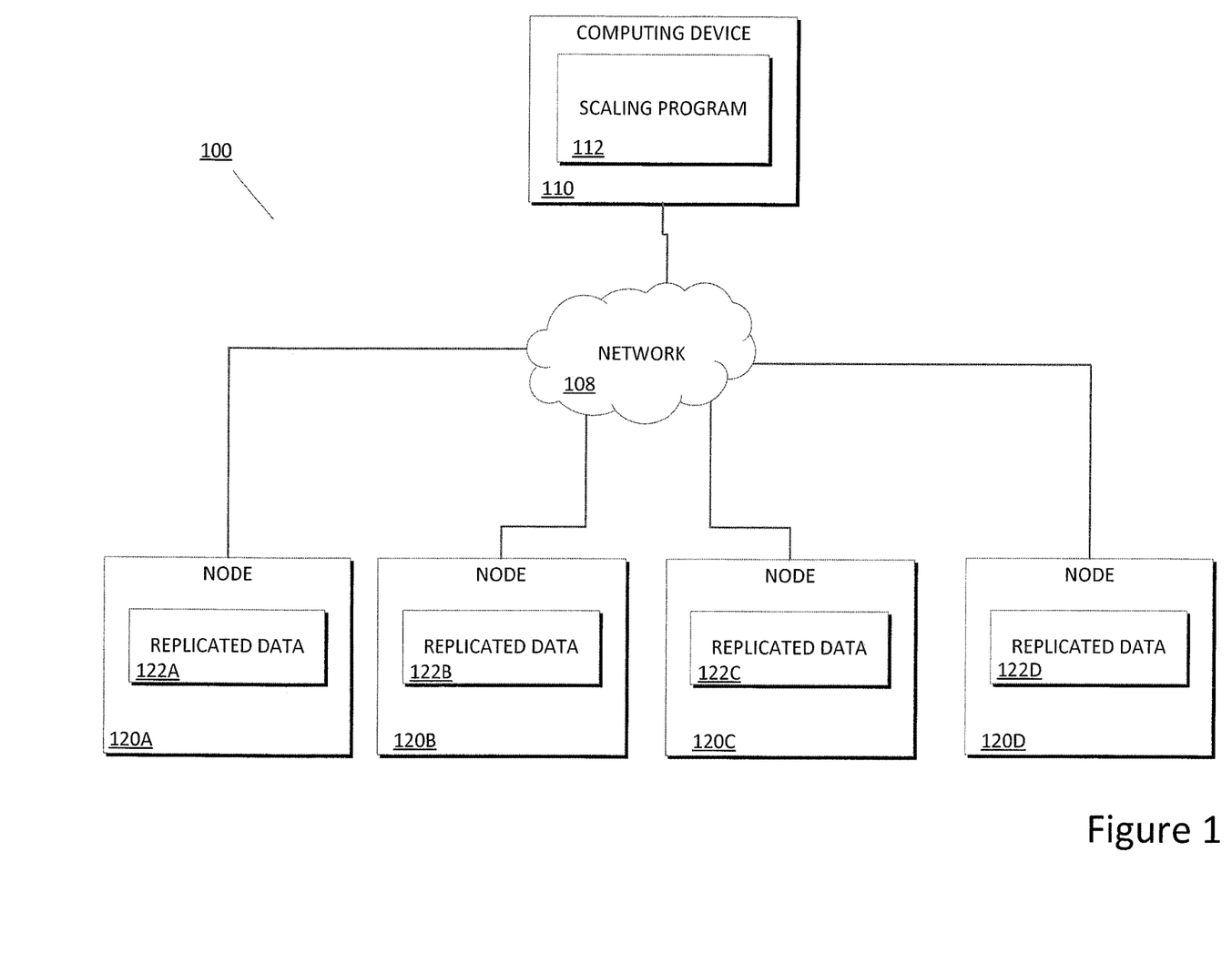
FIG. 1 illustrates a replication service scaling system 100, in accordance with an embodiment of the present invention.

FIG. 1 illustrates a replication service scaling system 100, in accordance with an embodiment of the invention. In the example embodiment, replication service scaling system 100 includes computing device 110 as well as nodes 120A, 120B, 120C, and 120D, all interconnected via network 108.

In the example embodiment, network 108 may be the Internet, representing a worldwide collection of networks and gateways to support communications between devices connected to the Internet. Network 108 may include, for example, wired, wireless, or fiber optic connections. In other embodiments, network 108 may be implemented as an intranet, a local area network (LAN), or a wide area network (WAN). In general, network 108 can be any combination of connections and protocols that will support communications between computing device 110 and nodes 120.

In the example embodiment, nodes 120 (node 120A, node 120B, node 120C, and node 120D) are a set of computing devices which store data, such as replicated data 122, and are capable of being configured to perform data replication. Data replication is advantageous because the redundancy of the replicated data allows it to remain accessible on at least one node, such as node 120A, in the event other nodes within the cluster, such as nodes 120B-D, were to fail. In the example embodiment, nodes 120 may be grouped together into a single replica set where replicated data within the replica set, such as replicated data 122A stored on node 120A, is in theory identical to the replication data of another node within the same cluster, such as replication data 122B stored on node 120B. In the example embodiment, one node, such as node 120A, may be designated as a replica set primary node while the remaining nodes, such as nodes 120B-D, are designated as replica set secondary nodes. The replica set primary node (in this example, node 120A) receives all write operations to replicated data 122A and logs all instances in an operations log, or oplog. After writes are executed on the primary node (node 120A), secondary nodes (nodes 120B-D) reference the oplog to determine which writes to make to the secondary nodes, thereby making the data in the primary node (node 120A) redundant across the secondary nodes (nodes 120A-D). This process is known as asynchronous replication, while synchronous replication applies writes to all nodes 120 simultaneously. While the example embodiment utilizes asynchronous replication, in other embodiments, synchronous replication may be implemented. It should be noted, however, that nodes within the replica set do fail and it is possible for writes logged in the oplog to not be reflected in the secondary nodes 120 (it is also possible for the replica set primary node to fail, in which case a new replica set primary node is elected from the replica set secondary nodes). In order to provide fault-tolerance for instances in which a secondary node fails, replica sets may be configured for quorum-based replication (or consensus-based replication) wherein a write to the primary node is only carried through in secondary nodes if the majority of the secondary nodes (quorum) accept the command. Thus, quorum-based data replication systems like that formed by nodes 120 will tolerate failures in a minority of the nodes while still making progress (read/writes) in the majority of the nodes. While operational nodes continue to make progress, nodes which have failed are then recovered and incorporated back into the replica set.

In the example embodiment, replicated data 122 (replicated data 122A, replicated data 122B, replicated data 122C, and replicated data 122D) is information contained in computer storage, such as files, folders, images, documents, audio clips, video files, etc. In the example embodiment, replicated data 122 may be redundant such that replicated data 122A may be identical to replicated data 122B and so forth depending on how nodes 120 are clustered. Alternatively, replicated data within a single node, such as replicated data 122A, may differ from one another, such as node 120B, again, based on how nodes 120 are clustered (described in more detail below).

In the example embodiment, computing device 110 includes scaling program 112. In the example embodiment, computing device 110 may be a laptop computer, a notebook, tablet computer, netbook computer, personal computer (PC), a desktop computer, a personal digital assistant (PDA), a smart phone, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 6.

In the example embodiment, scaling program 112 is a program on computing device 110 which is capable of determining when information, such as replicated data 122, within a node, such as one of nodes 120, of an original cluster reaches a threshold storage capacity. Scaling program 112 is additionally capable of receiving a user input indicating a request to "recluster" the original cluster and, in response to determining that a node has reached the threshold storage capacity and/or receiving a request to recluster, scaling program 112 is capable of capturing a snapshot of replicated data 122 within the original cluster. Scaling program 112 is further capable of partitioning the original cluster such that replicated data 122 is split between the original cluster and one or more clusters and initializing the new cluster(s) with data available from the snapshot. Moreover, scaling program 112 is capable of determining whether a request has been transmitted to the incorrect cluster and, if so, forwarding the request to the appropriate cluster.

Figure 2:
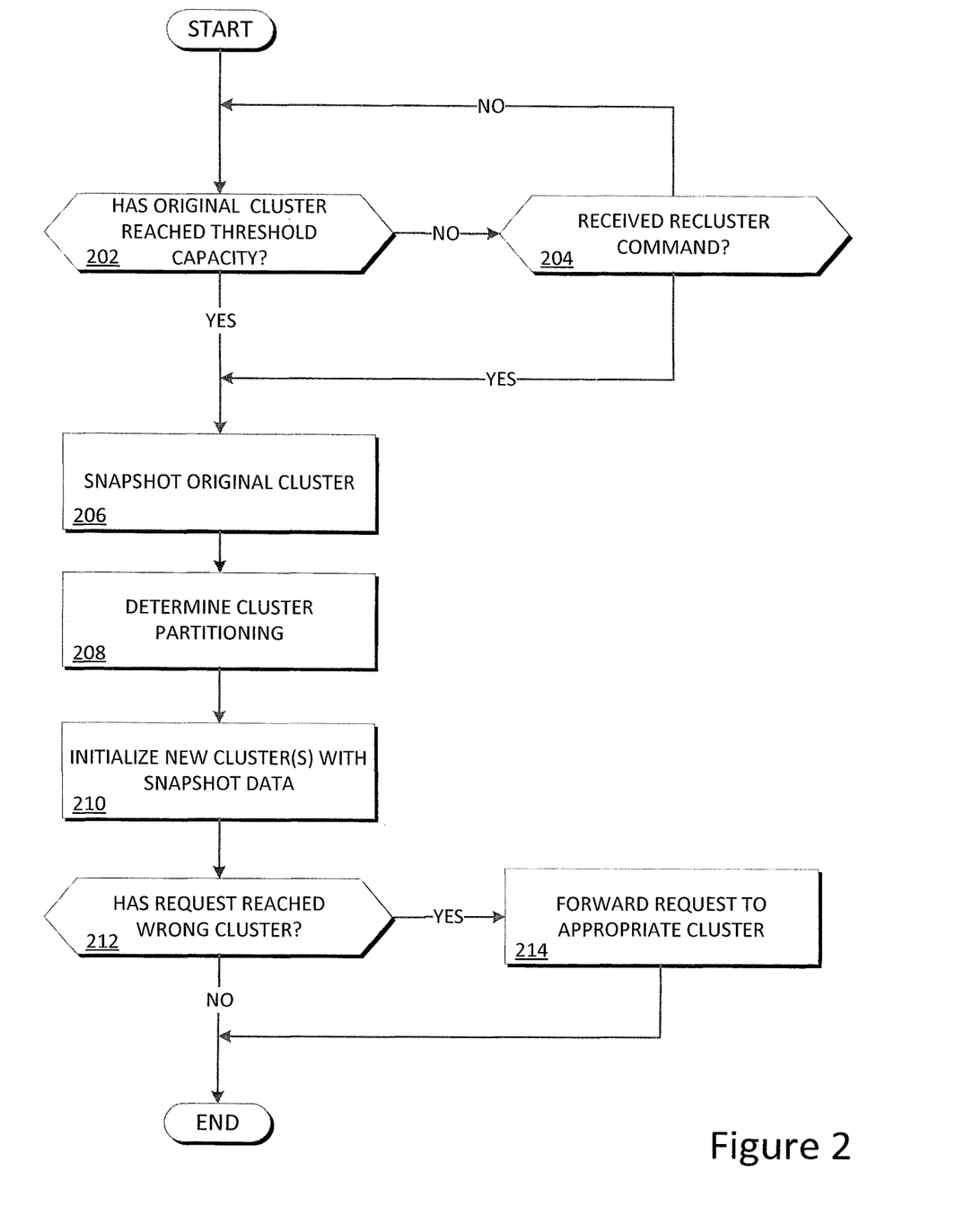
FIG. 2 is a flowchart illustrating the operation of the scaling program of FIG. 1 in providing on-demand extensibility and partitioning of a quorum-based replication server via reclustering.

FIG. 2 is a flowchart depicting the operation of scaling program 112 in providing on-demand extensibility of a quorum-based replication server via "reclustering" without the need to predefine a master cluster nor temporarily shut down the replication service. In the example embodiment, reclustering is the process of partitioning the nodes and data contained in a single replica set into multiple replica sets. For example, if a replica set stores tenants with last names A-Z, then scaling program 112 splits the nodes within the original cluster to create an additional new cluster and stores half of the data (tenants A-M) on the original cluster of nodes and the other half of the data (tenants N-Z) on the new cluster of nodes.

With reference to FIG. 2, scaling program 112 determines whether a node within nodes 120 of an original replica set has reached a threshold capacity (decision 202). In the example embodiment, scaling program 112 determines whether a node of nodes 120 has reached a threshold capacity, for example 90% of dedicated replication disk space, by communicating with the operating systems of nodes 120. In the example embodiment, a user may alter the threshold capacity such that nodes 120 may be filled to desired amounts up to 100%. Furthermore, in the example embodiment, nodes 120 have the same storage capacities. Nodes within the same replica set tend to have the same storage capacities because replication sets are designed to store the same data in as many places as possible. Therefore, if all nodes within a replica set are responsible for storing the same exact data, for example 100 GB of tenancy information, then all of the nodes within the cluster need capacities of 100 GB or more. For a node to have less capacity than others in the cluster would render it less useful and for a node to have greater capacity would be wasteful. It is because of this need for consistent capacities that nodes within the same replica sets tend to have common storage capacity. If, for example, one of the nodes within the replica set had only 64 GB capacity, then it would not be capable of replicating (backing up) the 100 GB of tenancy information and would reduce the effectiveness of the replica set. Therefore, when a single node 120 reaches storage capacity, such as node 120A, it is likely that other nodes 120 within the same cluster will reach storage capacity. For example, using a threshold of 90% capacity, if a replication set comprising nodes 120A-D having 100 GB capacity per node are each storing a replicated (identical) 90 GB of tenancy information, then scaling program 112 determines that 90% of the capacity of nodes 120A-D has been reached. Similarly, using the same example, even if nodes 120 had differing storage capacities and only node 120A of the replica set reaches 90% capacity, then scaling program 112 determines that one of the nodes of nodes 120 has reached 90% capacity.

If scaling program 112 determines that storage capacity of a node within a cluster has not been reached (decision 202 "NO" branch), then scaling program 112 determines whether computing device 110 has received a user input indicating a request to recluster the original cluster (decision 204). In the example embodiment, a recluster command is received by scaling program 112 from a user via a user interface of computing device 110 and denotes a function which partitions replicated data 122 of a single, original cluster into two or more clusters (described in greater detail below).

If scaling program 112 determines that it has not received a recluster command from a user (decision 204 "NO" branch), then scaling program 112 continues to determine whether a node within the original cluster has reached storage capacity (decision 202).

If scaling program 112 determines that the storage capacity of a node within an original replica set has been reached (decision 202 "YES" branch) or scaling program 112 receives a user command to recluster (decision 204 "YES" branch), then scaling program 112 captures a snapshot of the original cluster (step 206). In the example embodiment, the snapshot of the original cluster provides scaling program 112 with the contents, structure, metadata, and organization of replicated data 122 within the original cluster. In the example embodiment, the snapshot provides an overview of replicated data 122 such that scaling program 112 can determine the most effective and efficient means to partition/split the contents between the original cluster and a new cluster. Continuing the example above where replicated data 122 details tenancy information for an apartment complex, scaling program 112 captures a snapshot of the 100 GB of tenancy information within the original cluster to identify a table which categorizes the tenants of the apartment complex by name, year, building, unit, and unit type.

Scaling program 112 determines an optimal partition of the original cluster (step 208). Because replicated data 122 is being partitioned from an original cluster into two or more clusters (e.g. rather than storing all of replicated data 122 on each of multiple nodes making up a replica set, the nodes making up the original cluster are split between the original cluster and a new cluster and a portion of replicated data 122 is stored on the original cluster nodes while the other portion of replicated data 122 is stored on the new cluster nodes), scaling program 112 determines an optimal split of replicated data 122 between the original partition and the new partition such that related information is kept in the same cluster. Storing related replicated data 122 within the same clusters is advantageous organizationally and functionally because not only is it easier and quicker to collect/modify/add to large groups of related information from the same location, but rationally grouping related information together is more likely to result in less requests reaching the incorrect cluster following partitioning. While, in some embodiments, all information within replicated data 122 may be related, scaling program 112 seeks to determine an optimal partition of related information by analyzing the cluster snapshot for several different characteristics (described in greater detail below). In the example embodiment, scaling program 112 determines whether information contained replicated data 122, such as folders and files, are related to one another using natural language processing techniques in conjunction with reference to a relational database.

In the example embodiment, scaling program 112 first identifies terms within the names and/or metadata associated with the largest container(s) within replicated data 122, such as folders (step 208 continued). Containers that are identified to have similarities in name/metadata through character matching techniques, such as determining whether matching characters exceed a threshold percentage relative to word length (position sensitive), are assumed to be related and assigned a relation value indicating a relationship likelihood. For example, the folders "Tenants_2014" and "Tenants_2015" both share more than 90% of the same characters relative to word length ($^{11}/_{12}$ matching characters in both folder names) and are, therefore, considered related by scaling program 112. Furthermore, the assigned relation value may be weighted based on the amount of matching characters within terms such that more character matches within terms result in a greater relation value and thus a greater relationship likelihood. For example, terms which have ≥50% matching characters are assigned a relation value of 1, terms which have ≥75% matching characters are assigned a relation value of 3, and terms which have ≥95% matching characters is assigned a relation value of 5. Moreover, scaling program 112 may further utilize natural language processing techniques to recognize patterns and/or conventions within the names and metadata of identified containers to assign relation values. Using the example above, scaling program 112 may determine that the "2014" and "2015" of the folders "Tenants_2014" and "Tenants_2015" are indicative of a year and assign a relation value of 3 based on the identified pattern as well as assign a relation value of 5 based on the remaining matching characters of "Tenants_" and "Tenants_" matching ≥95% (100%), summing to a total relation value of 8.

Conversely, containers which do not have similar names and/or metadata, for example terms with <50% matching characters, are categorized by referencing a relational database to determine whether the names and/or metadata associated with the container belong to any of the same or similar categories (step 208 continued). For example, the folder "Tenants_Studio" and the folder "Tenants_OneBedroom" contain terms "Tenant," "Studio," and "OneBedroom" which may all be associated with the category of housing. If scaling program 112 determines that one or more containers are likely to be related based on associated name/metadata, scaling program 112 may be configured to perform a similar analysis to that above on the contents within the related containers, such as additional containers and files, to ensure the accuracy of and further define the relation value. In the example embodiment, if the relationship identified between the related containers is bolstered by relationships found within the contents of the related containers, then scaling program 112 may increase the relation value to reflect the greater likelihood of relatedness. Continuing the example above where the folders "Tenants_2014" and "Tenants_2015" are assigned a relationship value of 8, if the folders "Tenants_2014" and "Tenants_2015" contain files named John_Smith and Kathy_Johnson, respectively, and scaling program 112 compares John Smith and Kathy Johnson to the relational database to determine that they are both names, then scaling program 112 increases the relation value from 8 to 10 because both folders contain files related by the category "names." Conversely, if the terms within the contents of the related containers are not related, scaling program 112 maintains or reduces the relationship value. It should be noted that the aforementioned methods of partitioning replicated data 122 are merely examples and other methods may be implemented.

The relation values are then compared to one another and the contents of replicated data 122 which exhibit the highest relation value are grouped together to be partitioned to the same cluster (step 208 continued). In the example embodiment, scaling program 112 may be further configured to partition replicated data 122 by other metrics, such as alphabetical order, creation date, last use date (hotness), file size, file type, author, etc. Furthermore, in the example embodiment, scaling program 112 attempts to tailor the partitioning of replicated data 122 such that half of the replicated data in the original cluster is partitioned into a new cluster. For example, if nodes 120 reach storage capacity and replicated data 122 is tenancy data of tenants A-Z, then scaling program 112 partitions the data such that nodes 120A and 120B contain tenant information for tenants A-M while nodes 120C and 120D store tenant information for tenants N-Z. By partitioning half of the replicated data to a new cluster, it is more likely that all nodes 120 have freed up similar capacities to receive new replicated data 122.

Scaling program 112 initializes new cluster(s) based on the information detailed by the snapshot and the determined partitioning of replicated data 122 (step 210). For a more thorough explanation of initializing a new cluster (step 210), please refer to FIGS. 3-5 throughout this discussion as directed.

Figure 3:
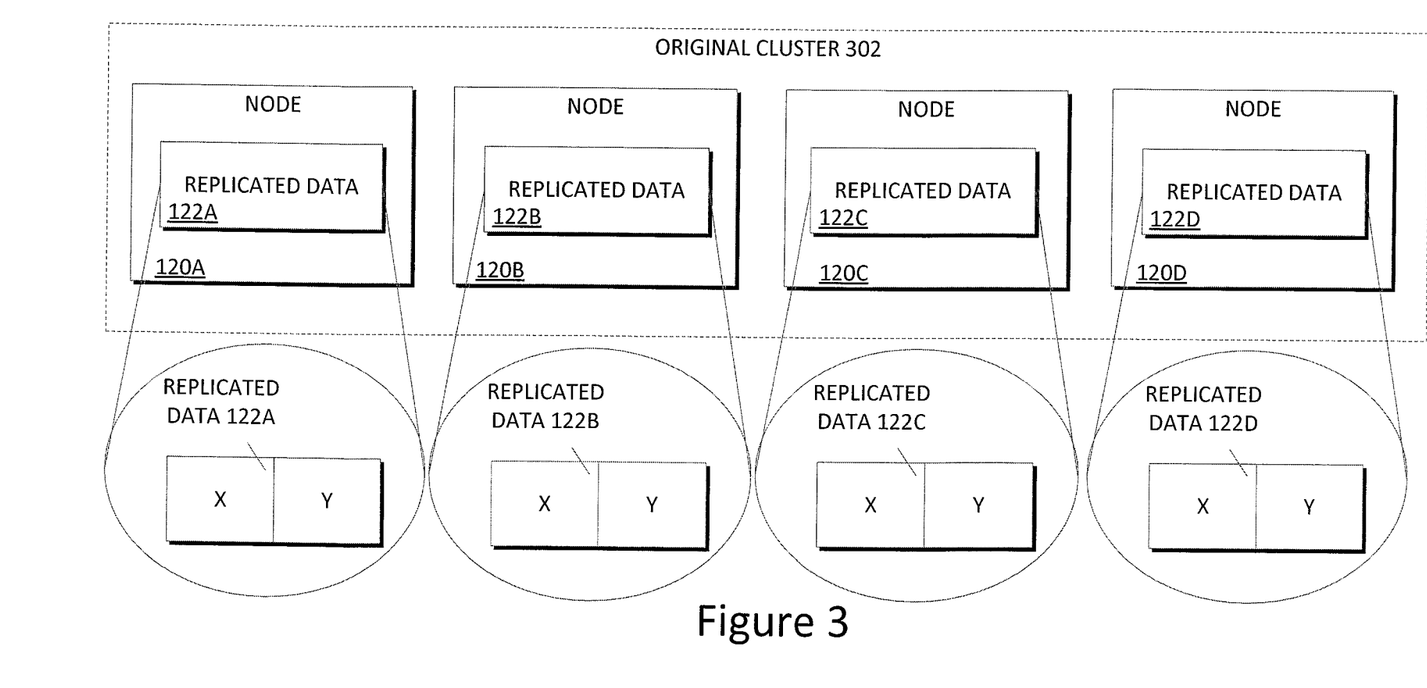
FIG. 3 illustrates an original cluster reaching storage capacity within a data replication system.

With reference now to FIG. 3, FIG. 3 illustrates original cluster 302 just prior to initializing a new cluster. Note that prior to reclustering, nodes 120 all contain both data X and data Y as nodes within original cluster 302, analogous to the tenancy information A-Z in the example introduced earlier. In addition, data X and data Y are visually depicted to occupy all of replicated data 122, indicating that the nodes are reaching maximum storage capacity and a recluster is necessary. It should be further noted that although data X is identical in all instances shown, the location at which data X is stored (i.e. node 120A, node 120B, etc.) varies and the same reference characters are used merely for simplicity.

Figure 4:
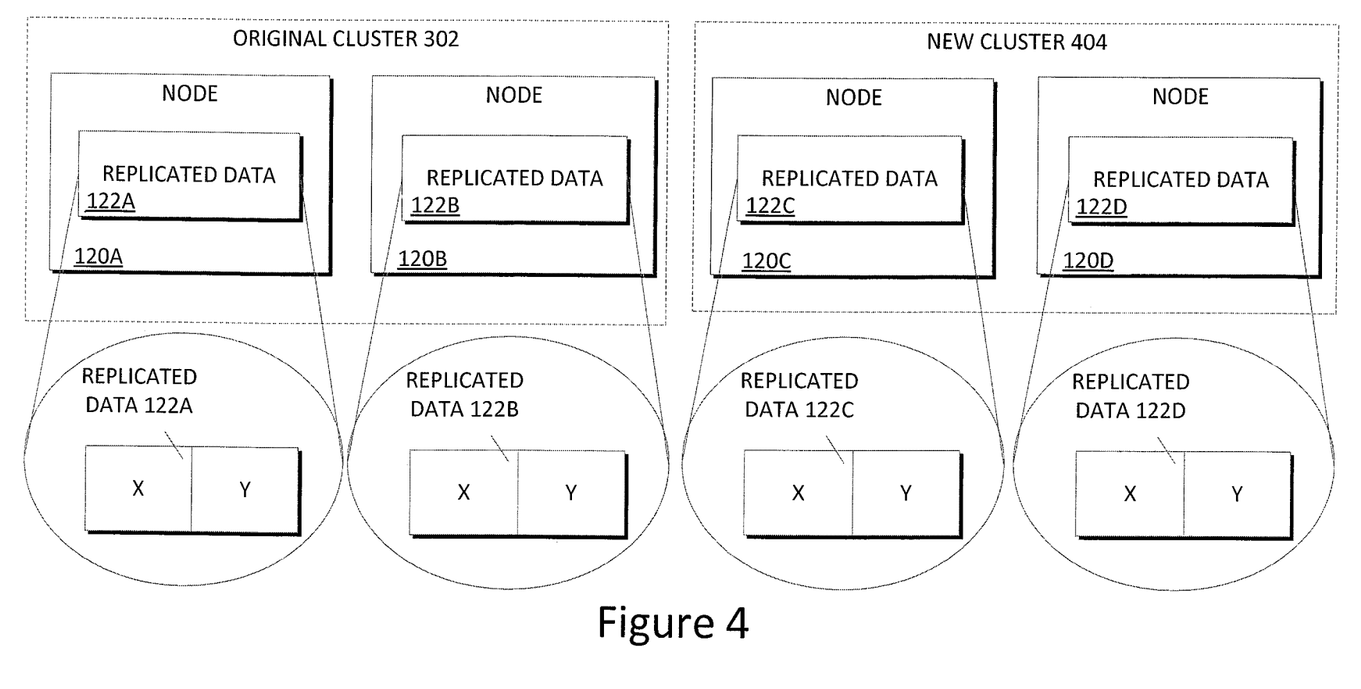
FIG. 4 illustrates the partitioning nodes from the original cluster into a new cluster during reclustering.

Now with reference to FIG. 4, when nodes 120 within original cluster 302 reach storage capacity, scaling program 112 initiates one or more nodes from original cluster 302 within new cluster 404, as shown by nodes 120C and 120D. During this transfer, data X and data Y (tenant data A-Z) are maintained on all nodes 120, allowing it to remain accessible throughout the reclustering process despite which replica set the node is part of. Moreover, the cluster snapshot obtained in step 206 and determined partitioning in step 208 allow scaling program 112 to determine in which cluster data is now stored.

Figure 5:
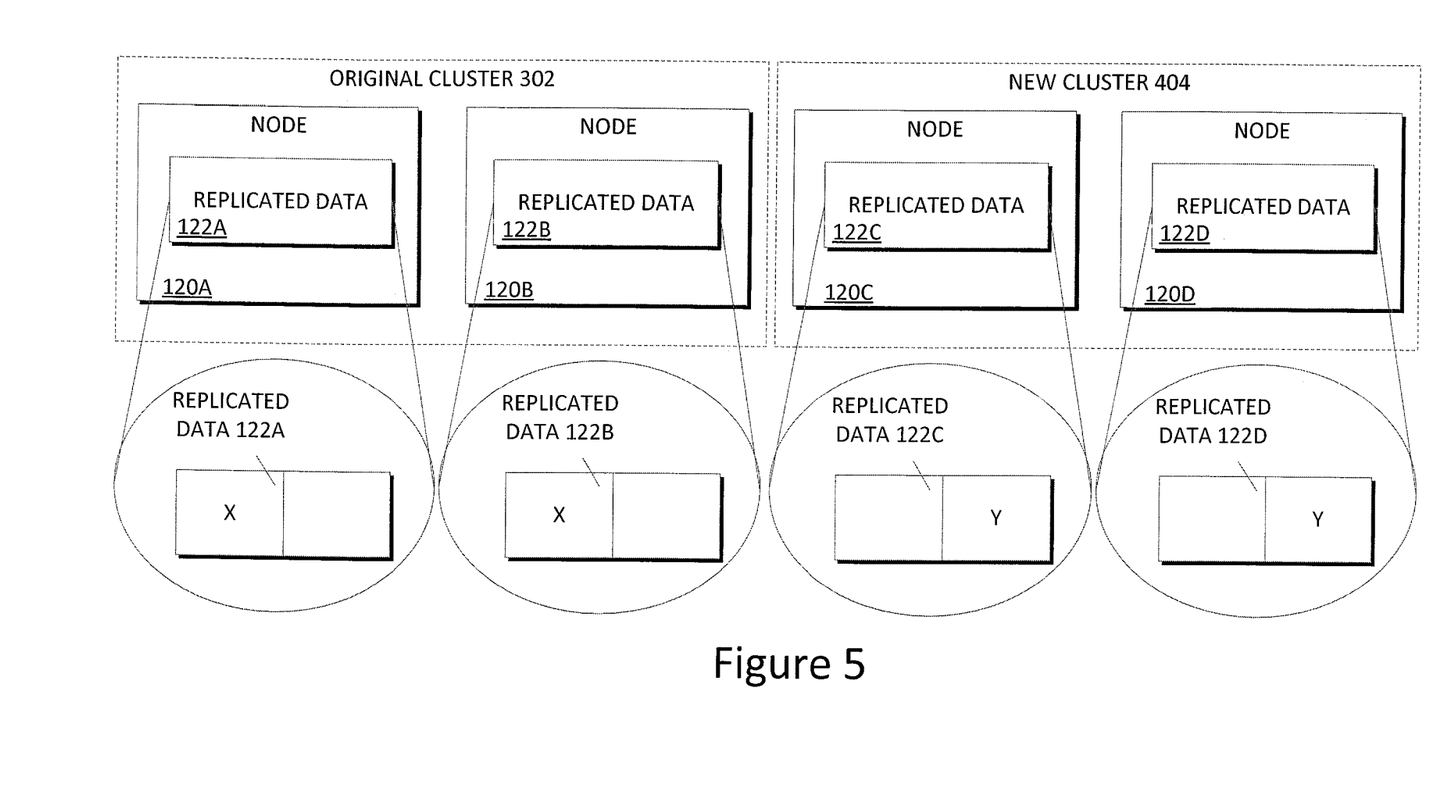
FIG. 5 illustrates multiple clusters following reclustering.

With reference now to FIG. 5, FIG. 5 illustrates original cluster 302 and new cluster 404 following initialization of new cluster 404. Having split nodes 120 into original cluster 302 and new cluster 404, scaling program 112 now removes redundant information from nodes 120 or, in other words, removes the replicated data that is to be partitioned to another cluster. For example, if original cluster 302 is to store data X (tenant data A-M), then scaling program 112 removes data Y (tenant data N-Z) from nodes 120A and 120B. Similarly, if new cluster 404 is to store data Y (tenant data N-Z), then scaling program removes data X (tenant information A-M) from nodes 120C and 120D. It is worth noting that although replicated data 122 is now only replicated on two nodes (data X on nodes 120A and 120B (2 instances), data Y on nodes 120C and 120D (2 instances) rather than data X and data Y on nodes 120A-D (4 instances)), additional nodes can be added to original cluster 302 or new cluster 404 to increase the number of backups. Moreover, having partitioned the entirety of the data, nodes 120 are now only storing a portion of the data, as depicted by the removal of data X and data Y from respective clusters in FIG. 5, and are no longer at maximum storage capacity. Therefore, the need to increase storage capacity across all nodes within the replica set has been eliminated by reducing the amount of data stored by each cluster. Moreover, the existing nodes are capable of replicating more data and additional backup nodes can be added at a later time to either of original cluster 302 or new cluster 404. It is worth noting that new replica sets, such as new cluster 404, may be initialized with new nodes, such as a node not included within nodes 120, in a similar manner to that above by replicating data from nodes 120 to the new node prior to removing redundant information. Moreover, replica sets, including newly created replica sets, can be reclustered any number of times.

With reference now to FIG. 2, scaling program 112 determines whether a read, write, or other request has reached the wrong cluster (decision 212). In the example embodiment, clusters are identified by a cluster ID which catalogs the replicated data 122 which is stored within the nodes of the cluster. In order to determine whether a request has reached the incorrect cluster, scaling program 112 analyses the request to identify the file, folder, etc. which is to be written, read, or modified otherwise and compares it to the cluster ID associated with the cluster receiving the request. If the request is associated with a file matching a file described by the cluster ID, then the request has reached the correct cluster.

If scaling program 112 determines that a request has reached the wrong cluster (decision 212 "YES" branch), then scaling program 112 references the cluster IDs of alternative clusters to determine in which cluster the replicated data 122 containing the requested file exists. Having identified the appropriate cluster for the request, scaling program 112 then forwards the request to the appropriate cluster (step 214). In addition, scaling program 112 may edit the cluster ID's corresponding to the relevant clusters to prevent further mix-ups.

FIG. 3 illustrates an original configuration of a cluster within a data replication system.

FIG. 4 illustrates a multiple cluster configuration following the reclustering of the original cluster illustrated in FIG. 3.

FIG. 5 illustrates an alternative multiple cluster configuration following the reclustering of the original cluster illustrated in FIG. 3.

Figure 6:
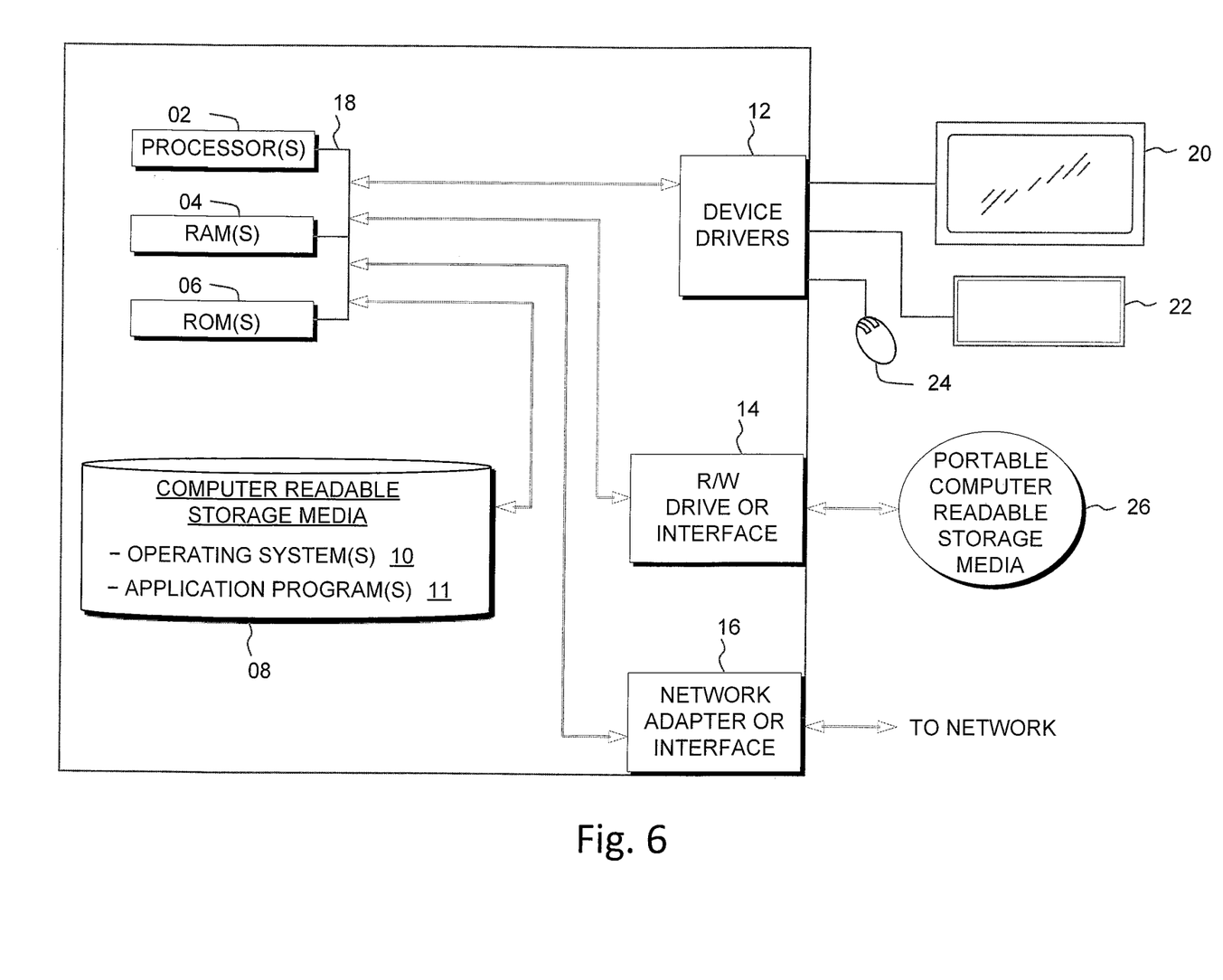
FIG. 6 is a diagram graphically illustrating the hardware components of the replication service scaling system of FIG. 1, in accordance with an embodiment of the invention.

FIG. 6 depicts a block diagram of components of computing device 110 of a replication service scaling system 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example, scaling program 112, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 14 to read from and write to one or more portable computer readable storage media 26. Application programs 11 on computing device 110 may be stored on one or more of the portable computer readable storage media 26, read via the respective R/W drive or interface 14 and loaded into the respective computer readable storage media 08.

Computing device 110 may also include a network adapter or interface 16, such as a TCP/IP adapter card or wireless communication adapter (such as a 4G wireless communication adapter using OFDMA technology). Application programs 11 on computing device 110 may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
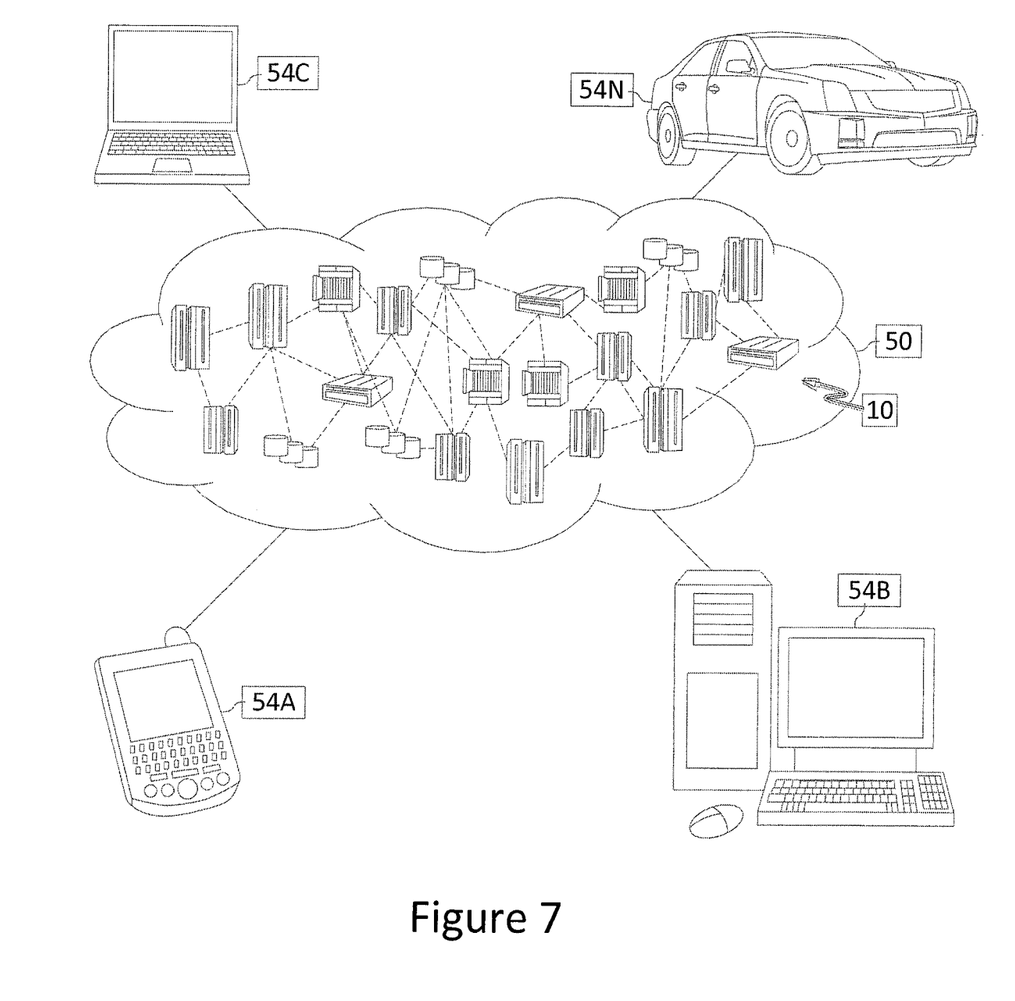
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
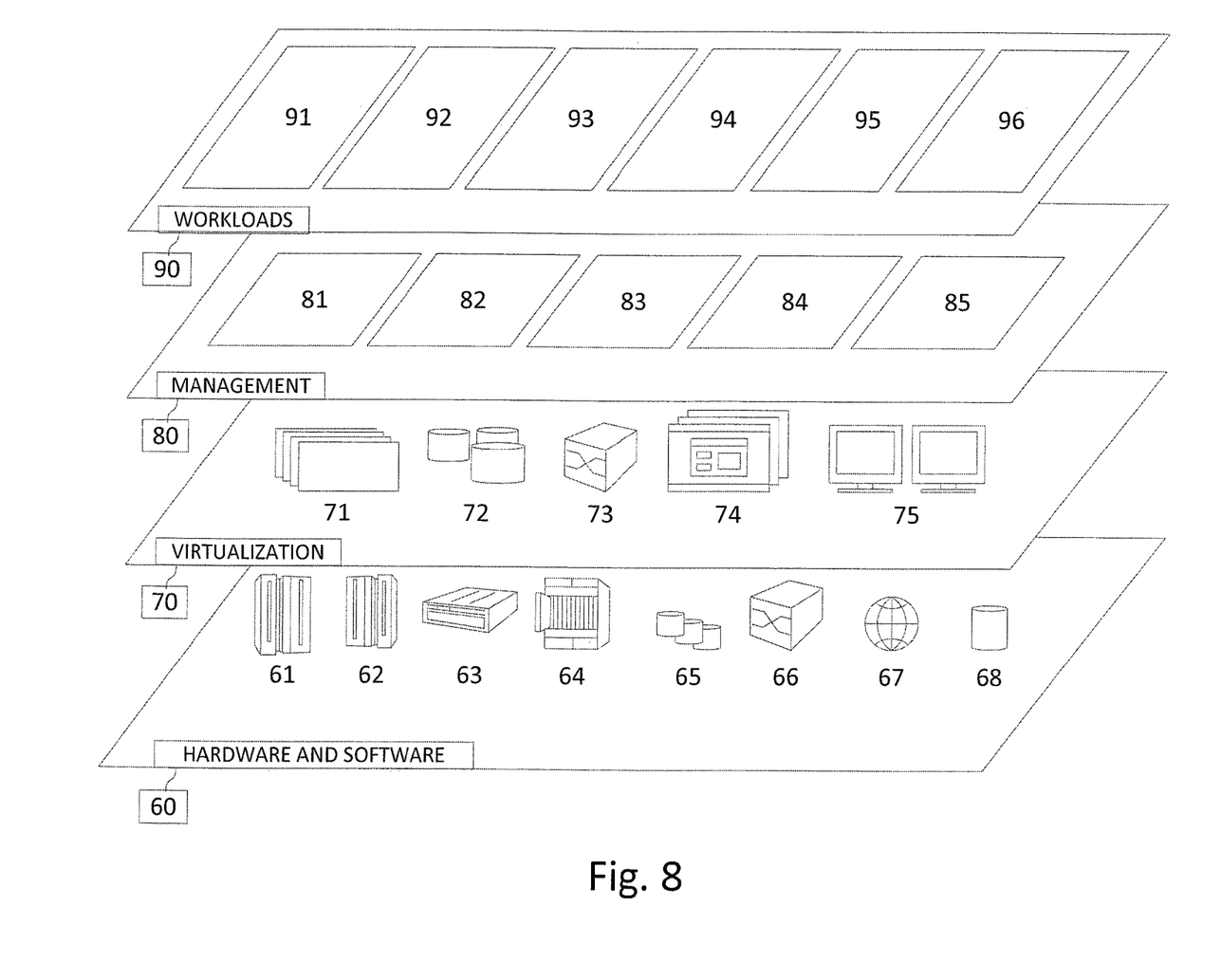
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and replica set scaler processing 96.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a replication service scaling system, the method comprising:
    determining, by a computer, whether an amount of replicated data stored on a computing device of one or more computing devices has reached a capacity threshold, wherein the one or more computing devices form an original replica set;

creating, by the computer, a snapshot detailing contents and structure of the replicated data stored on the one or more computing devices forming the original replica set;

based on determining that the amount of replicated data stored on the computing device has reached the capacity threshold, defining, by the computer, a cluster ID for each of a first replica set and a second replica set, wherein the first replica set includes a first set of computing devices from the one or more computing devices forming the original replica set, and wherein the second replica set includes a second set of computing devices from the one or more computing devices forming the original replica set, and wherein the first set of computing devices is mutually exclusive from the second set of computing devices, and wherein the cluster ID catalogs the replicated data within a replica set;

identifying one or more related files within the original replica set;

initializing, by the computer, the first replica set and the second replica set based on the snapshot;

partitioning, by the computer, the replicated data stored on the original replica set into a first partition and a second partition, wherein the one or more related files are stored together within the same partition; and removing, by the computer, the second partition from the first replica set and the first partition from the second replica set.

2. The method of claim 1, further comprising:

receiving, by the computer, a request to modify the replicated data by the first set of computing devices forming the first replica set;

determining, by the computer, whether the request corresponds to the replicated data stored on the first set of computing devices forming the first replica set by referencing the cluster ID pertaining to the first set of computing devices; and based on determining that the request does not correspond to the replicated data stored on the first set of computing devices forming the first replica set, forwarding, by the computer, the request to the second set of computing devices forming the second replica set.

3. The method of claim 1, further comprising:

partitioning, by the computer, the replicated data stored on the original replica set into a third partition based on the snapshot;

initializing, by the computer, a third replica set, wherein the third replica set includes a third computing device, and wherein the third computing device was not included in the one or more computing devices forming the original replica set; and replicating, by the computer, the third partition to the third computing device.

4. The method of claim 3, further comprising:

initializing, by the computer, a fourth computing device within the third replica set, wherein the fourth computing device was not included in the one or more computing devices forming the original replica set; and replicating, by the computer, the third partition to the fourth computing device.

5. The method of claim 1, wherein partitioning the replicated data stored in the original replica set further comprises:

partitioning, by the computer, the data stored in the original replica set into the first partition and the second partition based, at least in part, on at least one method selected from the group consisting of:

utilizing, by the computer, word matching techniques to identify the replicated data stored on the original replica set that is related; and replicated data name, replicated data creation date, last replicated data access date, replicated data type, replicated data size, and replicated data author.

6. The method of claim 1, wherein initializing the first replica set and the second replica set are further based on:

receiving, by the computer, a user input.

7. The method of claim 1, further comprising:

receiving, by the computer, a request to modify the replicated data stored on the one or more computing devices forming the original replica set during the initializing of the first replica set and the second replica set;

referencing, by the computer, the snapshot to determine a replica set storing the replicated data corresponding to the request; and forwarding, by the computer, the request to the determined replica set.

8. A computer program product for a replication service scaling system, the computer program product comprising:

one or more computer-readable storage media and program instructions stored on the one or more computer-readable storage media, the program instructions comprising:

program instructions to determine whether an amount of replicated data stored on a computing device of one or more computing devices has reached a capacity threshold, wherein the one or more computing devices form an original replica set;

program instructions to create a snapshot detailing contents and structure of the replicated data stored on the one or more computing devices forming the original replica set;

based on determining that the amount of replicated data stored on the computing device has reached the capacity threshold, program instructions to define a cluster ID for each of a first replica set and a second replica set, wherein the first replica set includes a first set of computing devices from the one or more computing devices forming the original replica set, and wherein the second replica set includes a second set of computing devices from the one or more computing devices forming the original replica set, and wherein the first set of computing devices is mutually exclusive from the second set of computing devices, and wherein the cluster ID catalogs the replicated data within a replica set;

program instructions to identify one or more related files within the original replica set;

program instructions to initialize the first replica set and the second replica set based on the snapshot;

program instructions to partition the replicated data stored on the original replica set into a first partition and a second partition, wherein the one or more related files are stored together within the same partition; and program instructions to remove the second partition from the first replica set and the first partition from the second replica set.

9. The computer program product of claim 8, further comprising:

program instructions to receive a request to modify the replicated data by the first set of computing devices forming the first replica set;

program instructions to determine whether the request corresponds to the replicated data stored on the first set of computing devices forming the first replica set by referencing the cluster ID pertaining to the first set of computing devices; and based on determining that the request does not correspond to the replicated data stored on the first set of computing devices forming the first replica set, program instructions to forward the request to the second set of computing devices forming the second replica set.

10. The computer program product of claim 8, further comprising:

program instructions to partition the replicated data stored on the original replica set into a third partition based on the snapshot;

program instructions to initialize a third replica set, wherein the third replica set includes a third computing device, and wherein the third computing device was not included in the one or more computing devices forming the original replica set; and program instructions to replicate the third partition to the third computing device.

11. The computer program product of claim 10, further comprising:

program instructions to initialize a fourth computing device within the third replica set, wherein the fourth computing device was not included in the one or more computing devices forming the original replica set; and program instructions to replicate the third partition to the fourth computing device.

12. The computer program product of claim 8, wherein partitioning the replicated data stored in the original replica set further comprises:

program instructions to partition the data stored in the original replica set into the first partition and the second partition based, at least in part, on at least one method selected from the group consisting of:

program instructions to utilize word matching techniques to identify the replicated data stored on the original replica set that is related; and program instructions to partition based on replicated data name, replicated data creation date, last replicated data access date, replicated data type, replicated data size, and replicated data author.

13. The computer program product of claim 8, wherein initializing the first replica set and the second replica set are further based on:

program instructions to receive a user input.

14. The computer program product of claim 8, further comprising:

program instructions to receive a request to modify the replicated data stored on the one or more computing devices forming the original replica set during the initializing of the first replica set and the second replica set;

program instructions to reference the snapshot to determine a replica set storing the replicated data corresponding to the request; and program instructions to forward the request to the determined replica set.

15. A computer system for a replication service scaling system, the computer system comprising:

one or more computer processors, one or more computer-readable storage media, and program instructions stored on one or more of the computer-readable storage media for execution by at least one of the one or more processors, the program instructions comprising:

program instructions to determine whether an amount of replicated data stored on a computing device of one or more computing devices has reached a capacity threshold, wherein the one or more computing devices form an original replica set;

program instructions to create a snapshot detailing contents and structure of the replicated data stored on the one or more computing devices forming the original replica set;

based on determining that the amount of replicated data stored on the computing device has reached the capacity threshold, program instructions to define a cluster ID for each of a first replica set and a second replica set, wherein the first replica set includes a first set of computing devices from the one or more computing devices forming the original replica set, and wherein the second replica set includes a second set of computing devices from the one or more computing devices forming the original replica set, and wherein the first set of computing devices is mutually exclusive from the second set of computing devices, and wherein the cluster ID catalogs the replicated data within a replica set;

program instructions to identify one or more related files within the original replica set;

program instructions to initialize the first replica set and the second replica set based on the snapshot;

program instructions to partition the replicated data stored on the original replica set into a first partition and a second partition, wherein the one or more related files are stored together within the same partition; and program instructions to remove the second partition from the first replica set and the first partition from the second replica set.

16. The computer system of claim 15, further comprising:

program instructions to receive a request to modify the replicated data by the first set of computing devices forming the first replica set;

program instructions to determine whether the request corresponds to the replicated data stored on the first set of computing devices forming the first replica set by referencing the cluster ID pertaining to the first set of computing devices; and based on determining that the request does not correspond to the replicated data stored on the first set of computing devices forming the first replica set, program instructions to forward the request to the second set of computing devices forming the second replica set.

17. The computer system of claim 15, further comprising:

program instructions to partition the replicated data stored on the original replica set into a third partition based on the snapshot;

program instructions to initialize a third replica set, wherein the third replica set includes a third computing device, and wherein the third computing device was not included in the one or more computing devices forming the original replica set; and program instructions to replicate the third partition to the third computing device.

18. The computer system of claim 17, further comprising:

program instructions to initialize a fourth computing device within the third replica set, wherein the fourth computing device was not included in the one or more computing devices forming the original replica set; and program instructions to replicate the third partition to the fourth computing device.

19. The computer system of claim 15, wherein partitioning the replicated data stored in the original replica set further comprises:
- program instructions to partition the data stored in the original replica set into the first partition and the second partition based, at least in part, on at least one method selected from the group consisting of:
  - program instructions to utilize word matching techniques to identify the replicated data stored on the original replica set that is related; and
  - program instructions to partition based on replicated data name, replicated data creation date, last replicated data access date, replicated data type, replicated data size, and replicated data author.

20. The computer system of claim 15, further comprising:
- program instructions to receive a request to modify the replicated data stored on the one or more computing devices forming the original replica set during the initializing of the first replica set and the second replica set;
- program instructions to reference the snapshot to determine a replica set storing the replicated data corresponding to the request; and
- program instructions to forward the request to the determined replica set.

* * * * *